US005204147A

United States Patent [19]

Schneider

[11] Patent Number: 5,204,147

[45] Date of Patent: Apr. 20, 1993

[54] ROLLER SHUTTER ROD OF STABLE SHAPE AND METHOD FOR ITS MANUFACTURE

[75] Inventor: Helmuth Schneider, Grevenbroich, Fed. Rep. of Germany

[73] Assignee: Vereinigte Aluminiumwerke AG, Bonn, Fed. Rep. of Germany

[21] Appl. No.: 662,932

[22] Filed: Mar. 1, 1991

[30] Foreign Application Priority Data

Mar. 12, 1990 [DE] Fed. Rep. of Germany ....... 4007777
Nov. 15, 1990 [DE] Fed. Rep. of Germany ....... 4036410

[51] Int. Cl.[5] .......................... E06B 9/11; B32B 1/04

[52] U.S. Cl. .................................. 428/35.8; 428/36.9; 428/36.91; 160/236; 160/133; 160/201; 160/235

[58] Field of Search .................... 428/34.1, 35.8, 36.9, 428/36.91, 213, 214, 457, 463; 160/133, 236, 201, 235

[56] References Cited

U.S. PATENT DOCUMENTS

| | | | |
|---|---|---|---|
| 4,470,444 | 9/1984 | Riexinger et al. | 160/235 |
| 4,723,588 | 2/1988 | Ruppel | 160/236 |
| 4,972,894 | 11/1990 | Machill | 160/235 |

FOREIGN PATENT DOCUMENTS

| | | |
|---|---|---|
| 370499 | 4/1983 | Austria . |
| 0034198 | 7/1980 | European Pat. Off. . |
| 0075768 | 4/1983 | European Pat. Off. . |
| 0365908 | 10/1989 | European Pat. Off. . |
| 2814825 | 10/1978 | Fed. Rep. of Germany . |
| 3508849 | 9/1986 | Fed. Rep. of Germany . |
| 8907455 | 11/1989 | Fed. Rep. of Germany . |
| 8813330 | 3/1990 | Fed. Rep. of Germany . |
| 2297987 | 8/1976 | France . |
| 53-051169 | 5/1978 | Japan . |
| 6408875 | 2/1966 | Netherlands . |

OTHER PUBLICATIONS

L. Dorn et al, "Beanspruchungsgerechte . . . Klebverbindungen", Kunststoffe 79, 1989, 6, pp. 491–499.

Hinterwaldner, "Hochleistungs . . . Verbindungsaufgaben", Fachbeitrag, Mar. 1987, pp. 61–62.

W. Wuich, "Grundlagen . . . Schmelzklebstoffen", GAK Dec. 1981, pp. 780–782.

*Primary Examiner*—Ellis P. Robinson
*Assistant Examiner*—Charles R. Nold
*Attorney, Agent, or Firm*—Marmorek, Guttman & Rubenstein

[57] ABSTRACT

The invention refers to a roller shutter rod of stable shape, consisting of an aluminum strip plastic-coated on one side at least in part, and roll-formed into a hollow section 18 with the coated side inwards, the hollow section featuring upper and lower connecting areas with double-layer aluminum strip and an inside wall 14 as well as an outside wall 13, said hollow section featuring for the increase of the longitudinal stiffness and durability of the roller shutter rod at least one contact point 15, at which at least two aluminum strip layers are bonded with one another.

11 Claims, 4 Drawing Sheets

ROLLER SHUTTER ROD OF STABLE SHAPE AND METHOD FOR ITS MANUFACTURE

BACKGROUND OF THE INVENTION

The invention refers to a roller shutter rod of stable shape, which consists of an aluminium strip roll-formed into a hollow section, and a method for the manufacture of such a dimensionally stable roller shutter member.

A roller shutter rod of stable shape, which features in the centerline of the hollow section a reinforcing part, is known from EP 00 75768. Said reinforcing part consists of a PVC insert, which can be additionally reinforced during manufacture by the extrusion process by means of a metallic core. The finished roller shutter rod of plastic material features disadvantages at weathering exposure, especially at exposure to solar radiation and low temperatures. Under these conditions, there can result an embrittlement of the plastic material, and after a longer exposure also a decolourizing of the outer coating. In addition, the manufacturing procedure is extremely time-consumed and expensive.

A roller shutter rod is known from the German registered utility patent G 8907445, which is roll-formed with the formation of connecting areas and walls from a plastic-coated aluminium strip. In this known roller shutter rod the coatings of the walls feature differing coating weights per unit area, so that it is possible to achieve a dampening of the vibrations of the section, and thus a reduction of sound emission.

Another roller shutter rod is described in the European patent application EP 03 65 908, which is roll-formed from a one-side coated aluminium strip into a hollow section, a double-layer plastic coating being formed in the area of the connecting areas, which ensures a damping of the sound radiated by the roller shutter, as the acoustic decoupling of the aluminium surfaces prevents the transmission of sound between same.

The invention is based on the task of realizing a roller shutter rod of stable shape, featuring improved bending strength and durability, without reducing the acoustic damping properties. The task of the invention is also the specification of a manufacturing method for such a roller shutter rod of stable shape with high bending strength and durability.

SUMMARY OF THE INVENTION

The task is solved in a roller shutter rod of stable shape of the initially mentioned type by following features:

- the aluminium strip is plastic-coated on one side at least in part,
- the coated side of the aluminium strip forms the inside of the hollow section:
- the hollow section features upper and lower connecting areas, in which the aluminium strip is arranged in a double layer,
- the hollow section features an inside wall and an outside wall,
- the hollow section features at least one contact point, at which at least two aluminium strip layers are bonded with one another.

The durability of the roller shutter rod of stable shape is the result of the fact that it consists of resistant aluminium in the areas exposed to weathering. The improved bending strength is due to the fact that in the area of the at least two aluminium strip layers a shifting of same in opposite directions, especially at torsional strain, is no longer possible. This is advantageous particularly in case of thermal stress, e.g. direct exposure to solar radiation of the roller shutter rod. The distortions occurring in known roller shutter rod in which the ends of the hollow sections running in guides slew about the longitudinal centerline, are prevented in the roller shutter rod according to the invention.

In a preferred embodiment of the invention, the connection of the at least two aluminium strip layers is formed by a plastic coating designed as hot-melt adhesive coating in the area of the contact point. The material contact in the area of the adhesive coating results in the bond desired. To this end, it is sufficient if the hot-melt adhesive coating is applied to the edge zones of the aluminium strip, which are facing each other in the double-layer formed strip areas after roll forming. In parts less heavily stressed, a glue joint by means of a plastic foil, which is either applied to the aluminium strip prior to roll forming, or separately introduced during roll forming before or after the roll former into the forming process, is sufficient. If the glued joint is to be restricted to the edge zones, it is sufficient to introduce a correspondingly narrow plastic strip together with hot-melt adhesive coating on both sides of the roller shutter rod.

Alternatively or additionally to the hot-melt adhesive coating, the bond can be formed also by a welded joint.

If the bond of the at least two aluminium strip layers is formed by a riveted, screwed or clinched connection, it is possible to achieve a good and, if desired, also detachable mechanical fixing.

The bond is preferably provided in one of the connecting areas, however, it is possible to fix correspondingly also both connecting areas.

In another embodiment of the invention, the at least two aluminium strip layers are formed by the inside wall and the outside wall, which are joined at a contact point into a bond. This design ensures not only the mechanical fixing of the surfaces in the connecting area, but also the reinforcement of the central area of the hollow section in at least one point, in order to increase the bending strength. This results, moreover, in a change of the resonance behaviour of the roller shutter rod and thus in an improvement of sound damping. The fixing between the inside wall and the outside wall is preferably achieved by deforming the inside wall in the direction to the outside wall, so that in the area of the contact point the inside wall features a smaller bending radius than the outside wall.

The roller shutter rod of stable shape according to the invention is preferably roll-formed from aluminium strip, which features a thickness between 0.15 and 0.8 mm.

The method according to the invention for the manufacture of a roller shutter rod of stable shape includes, for the solution of the basic task, following process steps: roll forming into a hollow section of a one-side plastic-coated aluminium strip with formation of double-layer connecting areas and of an inside wall as well as an outside wall, and establishment of a bond between at least two of the aluminium strip layers.

In addition to the process step of forming of the hollow section, it is thus provided according to the invention that, in the area where at least two aluminium strip layers are adjacent, said layers are fixed to one another by a bond, so that no displacement of the strip layers in the area of their contact point is possible. This results in the desired strengthening of the roller shutter.

The plastic material preferably consists of a bonding agent, the aluminium strip layers formed into a hollow section being pressurized in at least one of the two connecting areas until a bond has been established.

If the plastic coating consists of a hot-melt adhesive and the aluminium strip formed into the hollow section is glued or welded after heating in the area of the double-layer connecting areas, the material connection of the adhesive bond results in a particularly high bending stiffness.

A practical manufacturing procedure is ensured by the fact that the glueing or welding together takes place subsequently to the roll forming of the hollow section. The heating of the hot-melt adhesive can take place, however, also during the roll forming process by heating up of the aluminium strip.

An important method variant consists in the deformation of the inside wall in the direction of the outside wall in order to form a contact point.

BRIEF DESCRIPTION OF THE DRAWINGS

The invention is illustrated by several embodiments in the following.

The figures show.

DETAILED DESCRIPTION OF THE INVENTION

Figure 1:
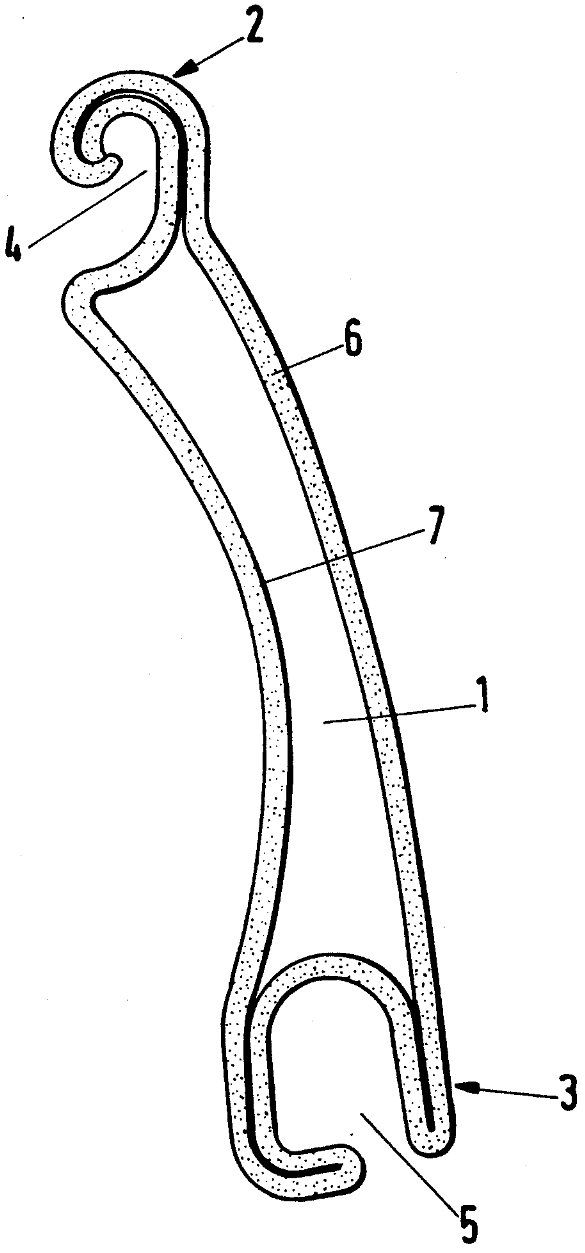
FIG. 1 Roller shutter rod coated over the entire surface with adhesive agent in the hollow section interior space.

FIG. 1 shows the roller shutter rod according to the invention, consisting of the hollow section 1 and two connecting ends 2, 3, with the corresponding hook and lug areas 4, 5. The roller shutter rod was made by roll forming from an aluminium strip 6, which is coated with a bonding agent 7 on the entire inside of the hollow section and also between the connecting ends.

The bonding agent 7 can be realized by extrusion coating, by application of a liquid, or by lamination of a polymer film. During roll forming, the bonding agent is pressure superposed at the connecting ends, and this results in an intimate contact between the bonding agent and the aluminium strip. This contact can be formed under the effect of heat into a bond, which withstands high mechanical loads.

A polyethylene copolymer has proved an adequate means for the coating of the aluminium strips. It is advantageous to provide the copolymer with sound-absorbing pigments, which are applied either in the liquid phase during extrusion on the aluminium strip, or contained already in the finished laminating agent. The all-over coating of the hollow section interior space substantially improve the sound-damping properties. The coating can be made also by means of a polypropylene film.

Figure 2:
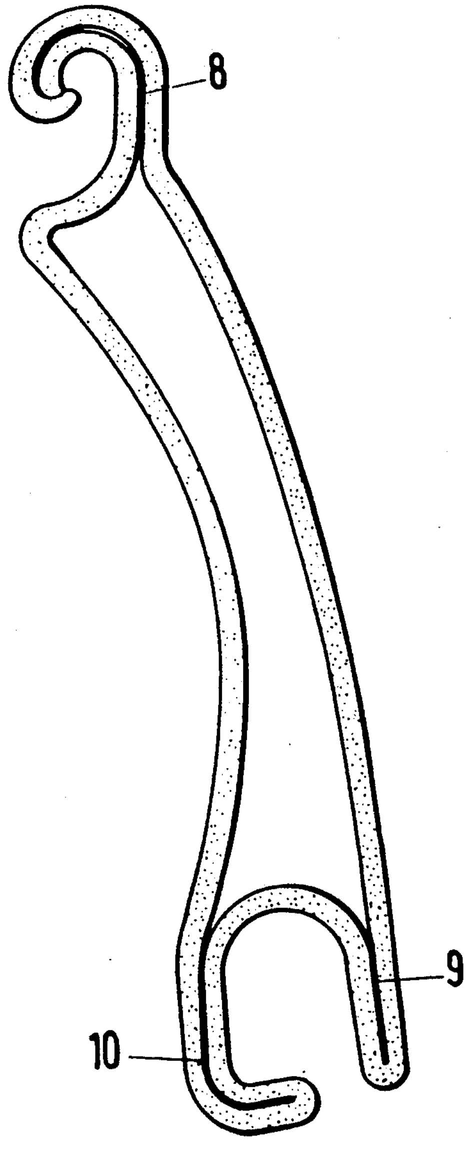
FIG. 2 Roller shutter rod coated with adhesive agent in the hook and lug area between the inside and outside wall of the aluminium strip.

In FIG. 2, the bonding agent is restricted to the contact points 8, 9, 10 at the connecting ends. This variant represents a simplified embodiment in comparison with the all-over coating illustrated in FIG. 1, which features, however, equivalent results in terms of dimensional stability.

The advantage of this solution consists in the simplified manufacture by use of correspondingly narrower plastic-coated areas at the contact points.

Figure 3:
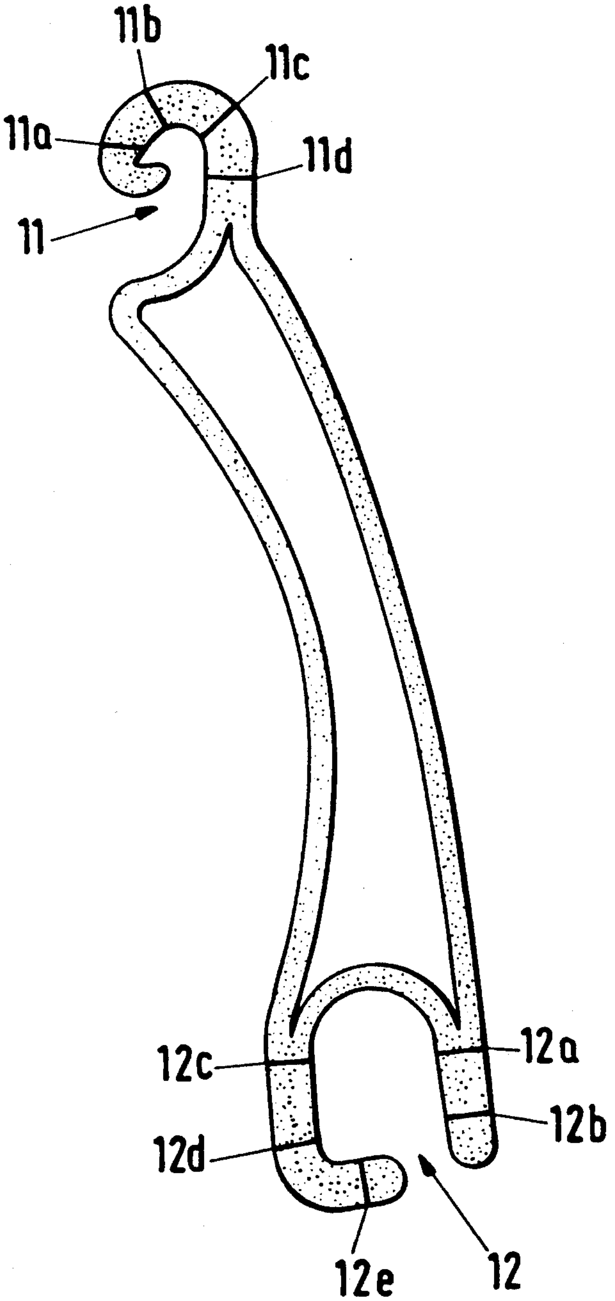
FIG. 3 Roller shutter rod with mechanical linkage in the hook and lug area.

FIG. 3 shows a mechanical linkage at the connecting ends of the roller shutter rods. In this embodiment, several rivets 11*a–d* as well as 12*a–e* are figured in the hook area 11 and in the lug area 12.

Figure 4:
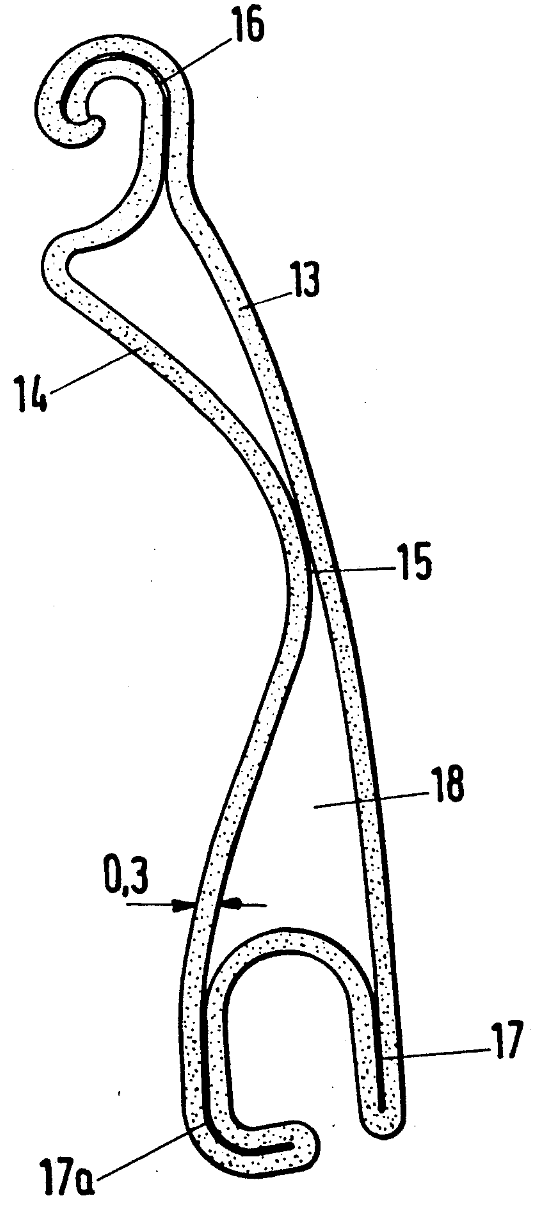
FIG. 4 Roller shutter rod with adhesive bonding between the inside and outside wall of the hollow section.

FIG. 4 shows now a bond in form of a glued joint between the outside wall 13 and the inside wall 14 of the roller shutter member. To this end, the aluminium strip has been deformed in the central area of the inside wall 14 to form a contact point with the outside wall 13. At this contact point, a previously applied bonding agent can effect the cramping. The cramping can be provided point-by-point at one or several contact points of the inside and outside wall, or also in a continuous line in the direction of the longitudinal centerline.

In addition to the glued joint 15 in the central area of the roller shutter rod, glued joints 16,17, 17*a* are provided also at the connecting ends. All the glued joints can be basically made also in cold or hot condition. In case of higher strength requirements, however, it has proved advantageous to bond the aluminium strip areas provided with a bonding agent under the effect of heat. The heating temperatures of the bonding agent are above about 100° C., and preferably in the range of 150° to 200° C. The hot-melt adhesive is activated in this way, and the resulting strength of the hollow section corresponds to that of a hollow section of the same size foamed in place with PU-foam.

Heating can be effected by standard means, e.g. by infrared or induction heating elements, which are arranged at a suitable point during the roll forming of the roller shutter element according to the invention.

The finished product has to be subsequently cooled in an appropriate manner, e.g. by air jet.

After complete curing, roller shutter rods according to the invention can withstand a solar radiation of up to 80° C. temperature. All the suitable resins, acrylates and hot-melt adhesives, e.g. polyamides, can be used as adhesive between plastic and metal.

As described previously, in addition to the contact points at the connecting ends of the roller shutter rod, it is possible to provide contact points also in the central area at various points of the hollow section. The contact points are produced by deforming the initially parallel running aluminium strip between the connecting ends of the roller shutter rod in the central area of the hollow section.

The inside wall 14 of the hollow section 18 is preferably deformed so that a contact point 15 with the outside wall 13 will result. It is possible, however, to deform the outside wall also, for example, in a bead manner, the bead bottom forming a contact point with the inside wall 14 of the hollow section 18. Furthermore, both walls 13, 14 can be deformed also simultaneously, if this is appropriate for higher strength and stability reasons.

The bond achievable by the glued joint in cold or hot condition can be produced also by other thermal processes, such as welding or soldering, or also by cold joining processes, such as pressure or welding.

In addition, mechanical linking methods, such as riveting, screwing, clinching and other methods of forming under compressive conditions, are also applicable. Decisive is the achievement of a temperature-resistant connection, capable of withstanding also an oscillating load, such as exerted by wind forces.

As mentioned initially, plastic materials and especially hot-melt adhesives can be used for the production of the bond. These are welded under the effect of heat (plastic materials), or glued (hot-melt adhesives). In addition to the copolymers such as polyethylene, mentioned in the description, polypropylene film can also be used.

It is also possible to use contact adhesives for the production of the bond. In this case the strip surfaces coated therewith are momentarily brought into contact under the effect of pressure, and a durable connection is thus realized at any point between the walls or connecting ends of the hollow section.

I claim:

1. A roller shutter rod of stable shape, comprising
an aluminum strip forming an outer periphery of said rod, said outer periphery defining a generally rod-shaped structure with a hollow section, said aluminum strip having a plastic coating along one of its sides which faces said hollow section, said outer periphery further defining upper and lower connecting areas wherein said aluminum strip is arranged in a double layer with a thermally consolidated double layer of plastic coating between individual layers of said double layer of aluminum strip, said individual layers of said double layer of aluminum strip in at least one of said upper and lower connecting areas being at least partially bonded to each other via said thermally consolidated double layer of plastic coating.

2. The roller shutter rod of claim 1 wherein said individual layers in both said upper and lower connecting areas are at least partially bonded to each other.

3. The roller shutter rod of claim 1 wherein said thermally consolidated double layer comprises individual plastic layers welded together.

4. The roller shutter rod of claim 1 wherein said plastic coating is a hot melt adhesive coating, and wherein said thermally consolidated double layer comprises individual plastic layers glued together.

5. The roller shutter rod of claim 1 further comprising a mechanical connector bonding said individual layers of aluminum strip to each other.

6. The roller shutter rod of claim 1 wherein said outer periphery further includes at least one contact point outside said upper and lower connecting areas at which adjacent aluminum strip layers are connected to each other.

7. The roller shutter rod of claim 6 wherein said hollow section has first and second sidewalls, said contact point being constituted between said first and second sidewalls.

8. The roller shutter rod of claim 6 wherein said adjacent aluminum strip layers at said contact point are connected to each other by said plastic coating.

9. The roller shutter rod of claim 6 wherein said adjacent aluminum layers at said contact point are connected to each other by means of a mechanical connector.

10. The roller shutter rod of claim 1 wherein said aluminum strip has a thickness in the range between 0.15 and 0.8 mm.

11. The roller shutter rod of claim 1 wherein said plastic coating has a thickness in the range between 40 and 120μ.

* * * * *